(12) United States Patent
Schewe

(10) Patent No.: US 11,940,037 B2
(45) Date of Patent: Mar. 26, 2024

(54) LINEAR ACTUATOR

(71) Applicant: LINAK A/S, Nordborg (DK)

(72) Inventor: Brian Schewe, Sønderborg (DK)

(73) Assignee: Linak A/S, Nordborg (DK)

( * ) Notice: Subject to any disclaimer, the term of this patent is extended or adjusted under 35 U.S.C. 154(b) by 164 days.

(21) Appl. No.: 17/438,325

(22) PCT Filed: Mar. 12, 2020

(86) PCT No.: PCT/DK2020/000070
§ 371 (c)(1),
(2) Date: Sep. 10, 2021

(87) PCT Pub. No.: WO2020/182258
PCT Pub. Date: Sep. 17, 2020

(65) Prior Publication Data
US 2022/0221035 A1    Jul. 14, 2022

(30) Foreign Application Priority Data
Mar. 13, 2019   (DK) .......................... PA 2019 00324

(51) Int. Cl.
*F16H 25/24* (2006.01)
*A61G 7/018* (2006.01)
*F16H 25/20* (2006.01)

(52) U.S. Cl.
CPC ......... *F16H 25/2454* (2013.01); *A61G 7/018* (2013.01); *F16H 2025/2071* (2013.01); *F16H 2025/2084* (2013.01); *F16H 2025/209* (2013.01); *F16H 2025/2463* (2013.01)

(58) Field of Classification Search
CPC ......... F16H 25/2454; F16H 2025/2071; F16H 2025/2463; A61G 7/018
See application file for complete search history.

(56) References Cited

U.S. PATENT DOCUMENTS

| 2008/0210029 A1 | 9/2008 | Wang |
| 2010/0139429 A1 | 6/2010 | Ku |
| 2013/0145550 A1 | 6/2013 | Roussy et al. |
| 2014/0326089 A1 | 11/2014 | Wu |

(Continued)

FOREIGN PATENT DOCUMENTS

| DE | 202008001634 U1 | 8/2009 |
| EP | 0498111 A2 | 8/1992 |
| EP | 0577541 A1 | 1/1994 |

(Continued)

*Primary Examiner* — Randell J Krug
(74) *Attorney, Agent, or Firm* — Dykema Gossett PLLC

(57) ABSTRACT

Linear actuator (8) comprising a quick release (27) for disengagement of an adjustment element (23) from an electric motor (19) and the part of a transmission (20) extending from the electric motor (19) to the quick release (27), such that the spindle (21) of the linear actuator is rotated under the load on the adjustment element (23). Further, the linear actuator comprises brake means (28) connected to the spindle (21) for controlling the speed of the adjustment element (23), when the quick release (27) is activated. A coupling (34;52,53,54) connected the brake means (28) is configured to set the brake means (28) in an active state, when the coupling (34; 52,53,54) is engaged, or in an inactive state, when the coupling (34;52,53,54) is slipping or disengaged.

13 Claims, 6 Drawing Sheets

(56) References Cited

U.S. PATENT DOCUMENTS

Figure 1:
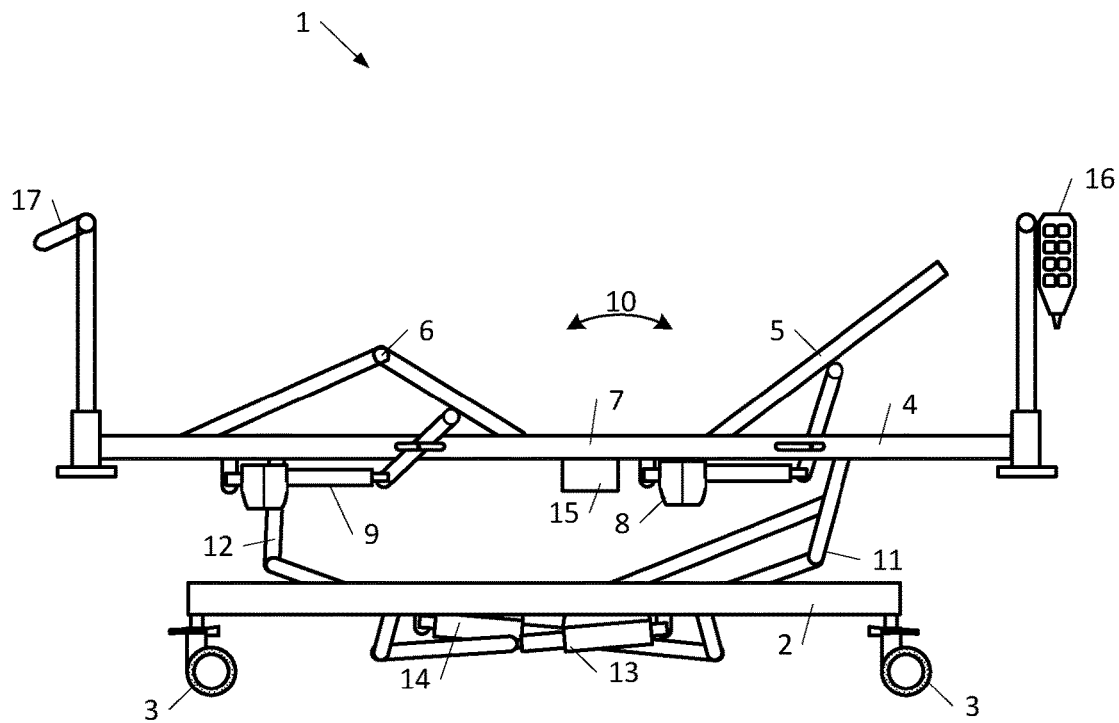

2017/0331350 A1* 11/2017 Sørensen ............... A61G 7/015

FOREIGN PATENT DOCUMENTS

| EP | 0685662 A2 | 12/1995 | |
|---|---|---|---|
| EP | 0944788 B1 | 3/2003 | |
| WO | 2003033946 A1 | 4/2003 | |
| WO | 2006039931 A1 | 4/2006 | |
| WO | 2011066836 A1 | 6/2011 | |
| WO | WO-2011066836 A1 * | 6/2011 | ........... A47C 20/041 |
| WO | 2016026495 A2 | 2/2016 | |

* cited by examiner

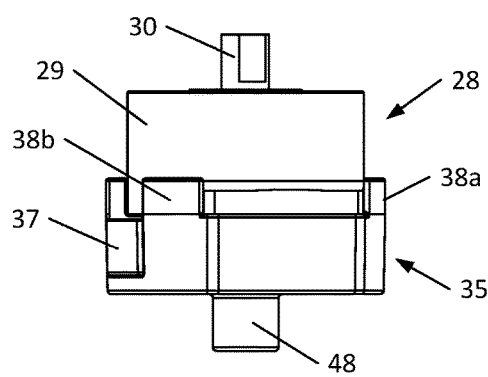
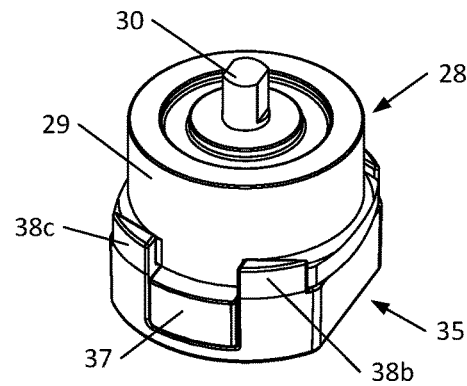
Fig. 10a Fig. 10b
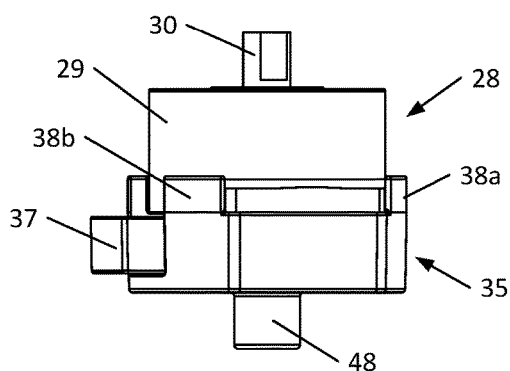
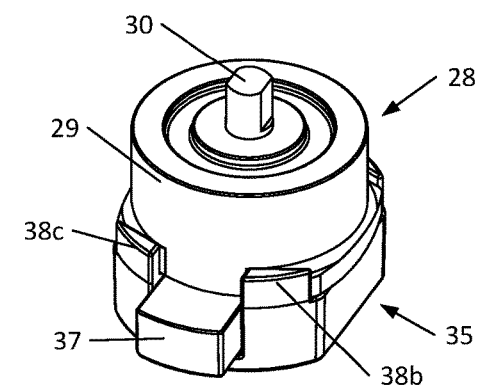
Fig. 11a Fig. 11b
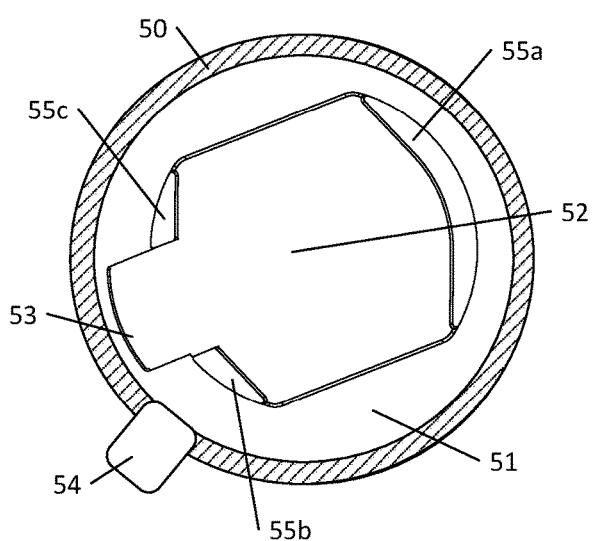
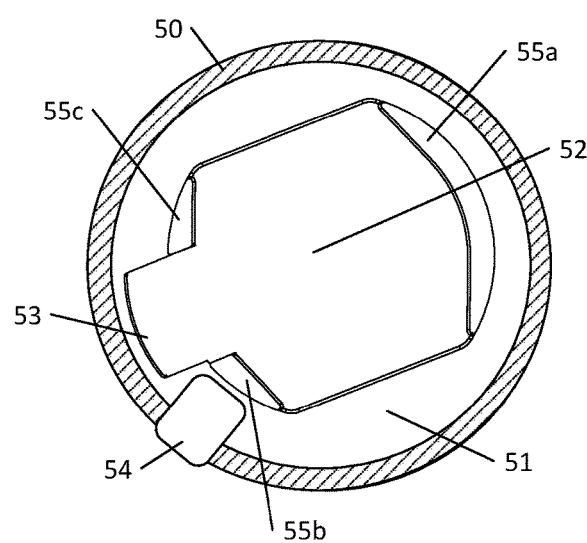
Fig. 12a Fig. 12b

LINEAR ACTUATOR

CROSS-REFERENCE TO RELATED APPLICATIONS

This application is a national stage filing based upon International PCT Application No. PCT/DK2020/000070, filed 12 Mar. 2020, which claims the benefit of priority to Denmark application No. PA 2019 00324, filed 13 Mar. 2019.

The invention relates to a linear actuator of the type mentioned in the preamble of claim 1.

In hospital and care beds, the carrying surface for the mattress is divided into a back-rest section and a leg-rest section as well as typically also a fixed middle section. The back-rest and leg-rest sections are individually adjustable about a horizontal axis by means of a linear actuator each, cf. e.g. EP 0 498 111 A2 J. Nesbit Evans & Company Ltd.

In certain situations, e.g. in case of heart failure, it is crucial to be able to immediately lower the back-rest section from a raised position to a horizontal position. The speed of a linear actuator is simply too low to be able to perform the required immediate lowering of the back-rest section to a horizontal position. To solve the problem, linear actuators with a so-called quick release have been developed, which disengages the spindle itself, which is of a non-self-locking type, from the motor or disengages a part of the transmission in driving connection with the spindle, where this part of the transmission and the spindle are non-self-locking. Examples of linear actuators of this type with quick release are known from e.g. EP 0 577 541 A1, EP 0 685 662 A2, WO 03/033946 A1 and WO 2006/039931 A1 all to LINAK A/S. As mentioned, it is noted that the spindle of the linear actuator is not self-locking, so that the load on the tubular adjustment element of the linear actuator, which is connected to the spindle nut, rotates the spindle. The spindle will accelerate as a result of the force from the load, such that the adjustment element with increasing speed will move towards the end position, and the back-rest section will be suddenly braked in a collision-like manner, when the back-rest section reaches its horizontal position. The acceleration towards the horizontal position is enhanced by the construction of the bed, where the load on the linear actuator is smallest when the back-rest section assumes its maximum raised position. The impact of the force is significantly increased the closer the section gets to its horizontal position, where the impact of the force is at a maximum. This collision-like braking can to a great extend be injurious to the patient, who already is traumatized, and further it is a tremendous overload of the bed structure and the linear actuator. As such, a traumatic situation on the whole is chaotic around the patient, as well as being a not insignificant risk that someone will get squeezed between the back-rest section and the upper frame in which the back-rest section is embedded, when the back-rest section uncontrolled rushes to a horizontal position. The problem is sought solved by incorporating gas springs in the bed structure to dampen the movement, but this complicates and adds costs to the construction, see e.g. DE202008001634 to DEWERT ANTRIEBS UND SYSTEMTECHNIK. This is owing to the fact that the bed structure comprises extra mountings or the like to which the gas springs can be secured. In addition to this, the mounting time increases and the gas springs are an added cost. Further, the bed will often be equipped with two gas springs to meet existing requirements. Thus, this solution does not intuitively appear to be the right solution to the problem. This problem is previously realized in EP 0 944 788 B1 to LINAK A/S, which concerns a linear actuator with quick release and brake means for controlling the speed of the spindle when the spindle is disengaged from the motor and transmission. The embodiment shown in EP 0 944 788 B1 deals with a screw spring functioning as a brake spring, which tightens against a fixed contact surface. By a controlled loosening of the engagement of the screw spring against the contact surface, the speed of the spindle can be controlled. The construction is fine but requires adroitness for the operator to be able to control the speed evenly. Moreover, the construction is complex. WO2011/066836 A1 to LINAK A/S discloses a construction where this problem of controlling the speed manually is sought solved by means of a centrifugal brake, but this construction is likewise rather complex and does not solve the problem completely.

In WO2016/026495 to LINAK a linear actuator has brake means constituted by a rotary damper of the fluid type comprising an internal body located in a liquid-filled hollow in an outer body, where one body is in driving connection with the spindle or the part of the transmission, which extends from the spindle to the quick release, and where a dampening effect, which dampens the speed of the spindle and thus the adjustment element, is generated when this body is rotated relative to the other body as a result of activation of the quick release. However, since the dampening is in response to the rotational speed of the spindle, the dampening will vary along the stroke length spindle. Lowering of the back-rest section may therefore take a while.

The purpose of the invention is to provide a different solution for a controlled lowering or retraction of an adjustment element when this is disengaged from the motor and the transmission.

The linear actuator according to the invention is characteristic in that it comprises a coupling connected to the brake means, where the brake means is configured to be in either 1) an active state, where the rotation of the spindle is braked, or 2) an inactive state, where the rotation of the spindle is not braked. The coupling being configured to be in a state of either 3) engaged, or 4) slipping or disengaged, and where the coupling will set the brake means in 1) the active state, when the coupling is 3) engaged, or 2) the inactive state, when the coupling is 4) slipping or disengaged.

Hereby, the brake means are not activated until the coupling is in its engaged state. This state of the coupling can be reached by using an automatic coupling or a manual coupling.

In an embodiment, the coupling is a centrifugal coupling acting in response to the rotational speed of the spindle. It is thus possible to provide a construction where the lowering speed is controlled in response to the rotational speed of the spindle when the quick release is activated.

In an embodiment, the coupling comprises a rotation holder, a spring, and a sliding element, where the rotation holder comprises a cavity for receiving the sliding element, and where the cavity comprises an opening through which at least a part of the sliding element can be displaced. The spring is arranged between the sliding element and the rotation holder such that the sliding element is spring-loaded relative to the rotation holder. The linear actuator comprises a stop prepared for engagement with the part of the spring-loaded sliding element extending out of the opening of the rotation holder, where the coupling is in 3) the engaged state, when the part of the spring-loaded sliding element extending out of the opening of the rotation holder fully engages the stop, and is in 4) the slipping or disengaged state, when the part of the spring-loaded sliding element extending out of the opening of the rotation holder is slipping or disengaged from the stop. If the rotational speed of the spindle passes a certain threshold, the centrifugal force exerted on the sliding element will cause it to be displaced out of the opening of the cavity. This threshold is only reached if the quick release unit is activated. Hence, during normal operation of the linear actuator, the brake means will not be worn.

In an embodiment, the linear actuator comprising a rear mounting for mounting of the linear actuator, where the rear mounting comprises a cavity adapted to receive at least a part of the centrifugal coupling, where the side wall of the cavity has an approximately circular cross section, and where a circular arc of the side wall is displaced radially outwards, and where the circular arc comprises the stop. By incorporating at least a part of the coupling into the rear mounting, the built-in dimensions of the linear actuator can be kept as small as possible.

In an embodiment, the brake means is a rotary damper or a wrap spring.

In an embodiment, the spring of the centrifugal coupling is a compression spring or extension spring.

In an embodiment of the linear actuator, the coupling is a manual coupling. Hereby, an operator can determine when to engage the coupling and thus active the brake means.

In an embodiment, the linear actuator comprises a rear mounting for mounting of the linear actuator and the manual coupling comprises a damper holder with a protrusion extending out from the side of the damper holder, and where the rear mounting comprises a cavity for receiving at least a part of the manual coupling, and further comprises a stop element, which can be moved in and out of the cavity by a manual operation. Where the manual coupling is in the engaged state when the stop element extends into the cavity, such that the protrusion engages the stop element, whereby the damper holder cannot rotate, and where the manual coupling is in the slipping or disengaged state when the stop element is fully or almost fully retracted from the cavity, such that the damper holder can rotate.

In another embodiment, the invention relates to a bed comprising an adjustable carrying surface for a mattress and where the carrying surface comprises an adjustable section. The bed comprises at least the one linear actuator of the type described above, configured to adjust the adjustable section of the bed. In a further embodiment, the adjustable section of the bed is a back-rest section. In yet a further embodiment, the bed is a hospital or care bed. In these embodiments, the coupling can be configured to lower or retract the adjustment element as fast as possible and at the same time duly consider the health and required treatment of a person or patient occupying the bed. In addition, the adjustable section can be lowered without damaging the bed.

Figure 2:
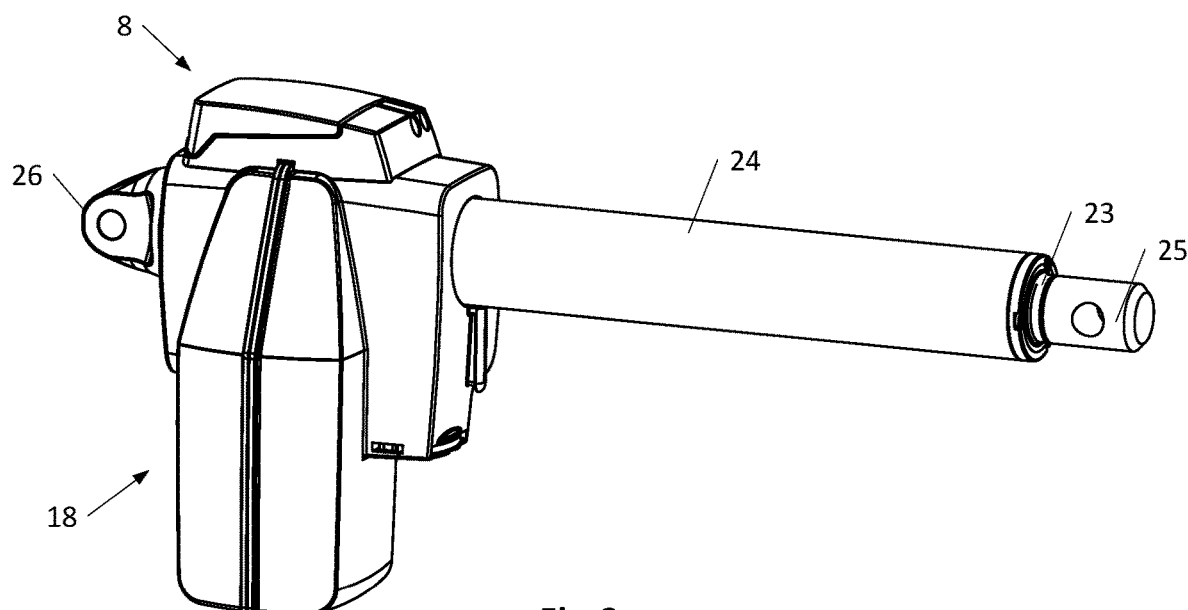
Figure 3:
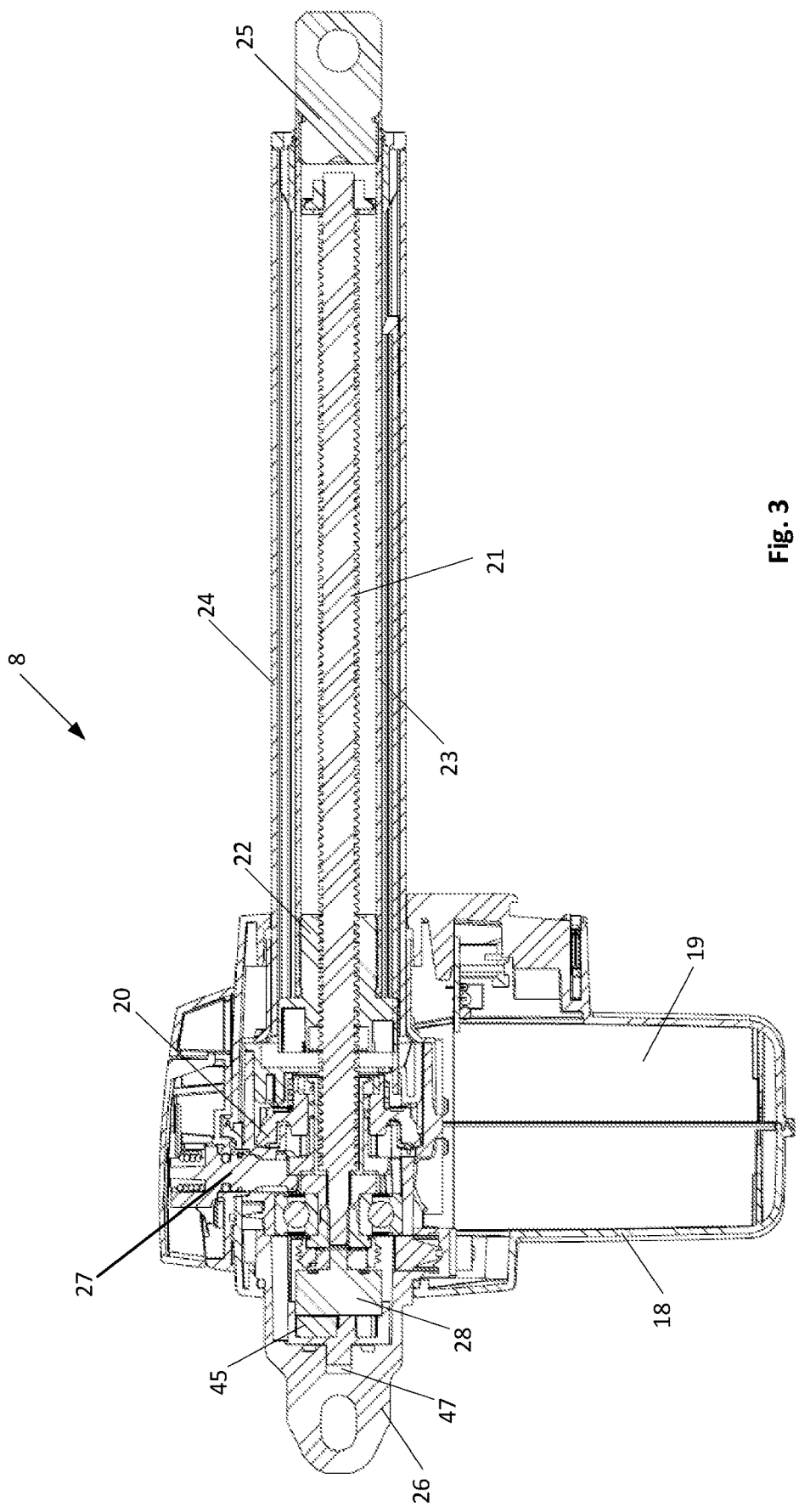
Figure 4:
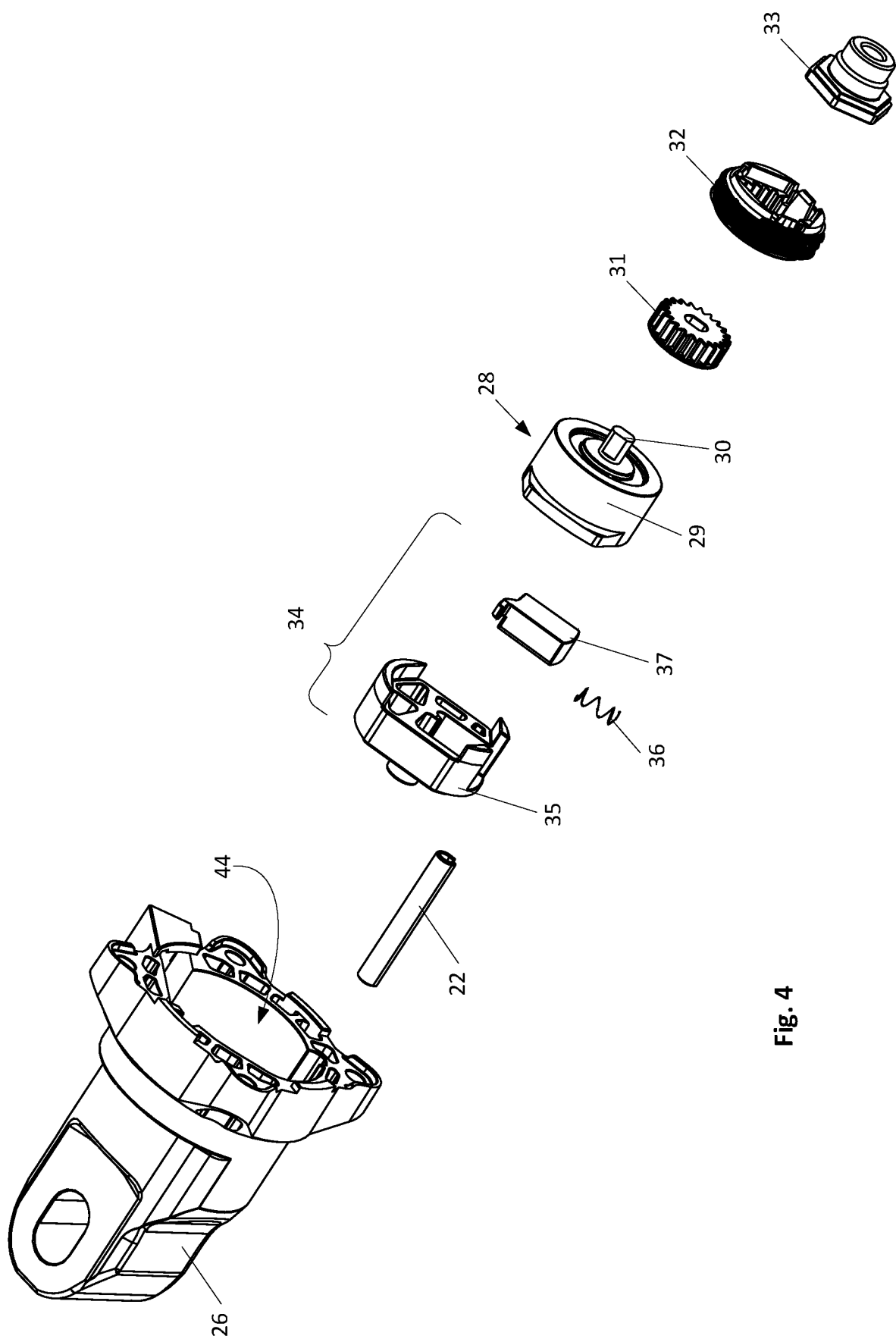
Figure 5A:
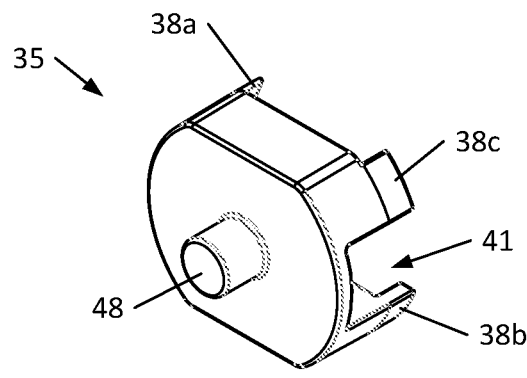
Figure 5B:
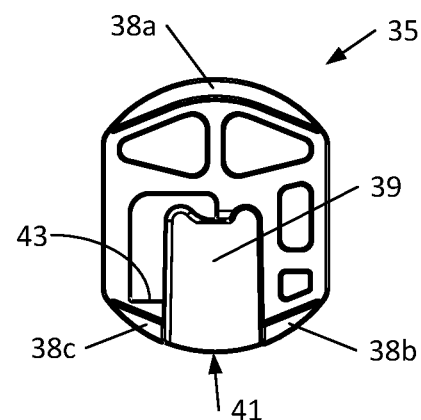
Figure 5C:
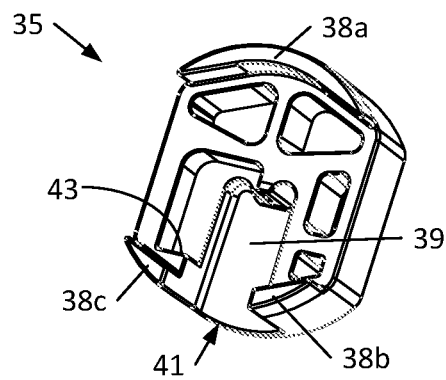
Figure 5D:
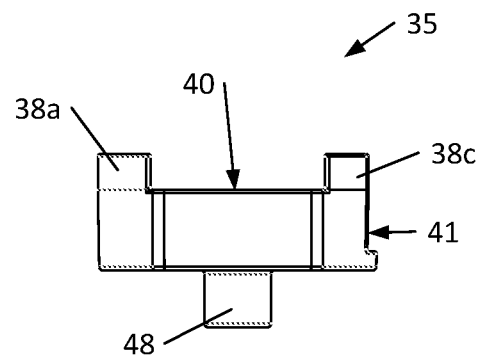
Figure 6A:
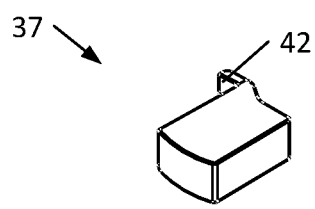
Figure 6B:
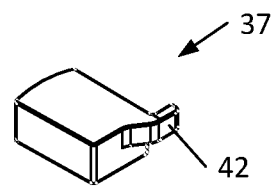
Figure 7A:
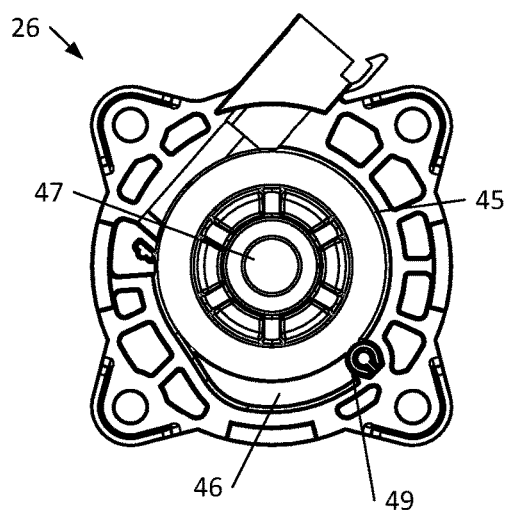
Figure 7B:
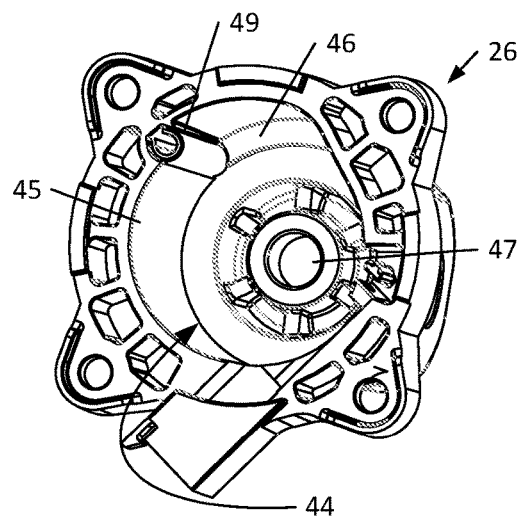
Figure 8:
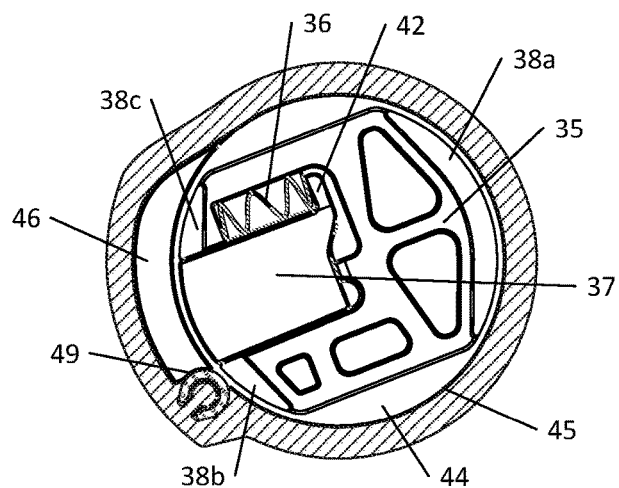
Figure 9:
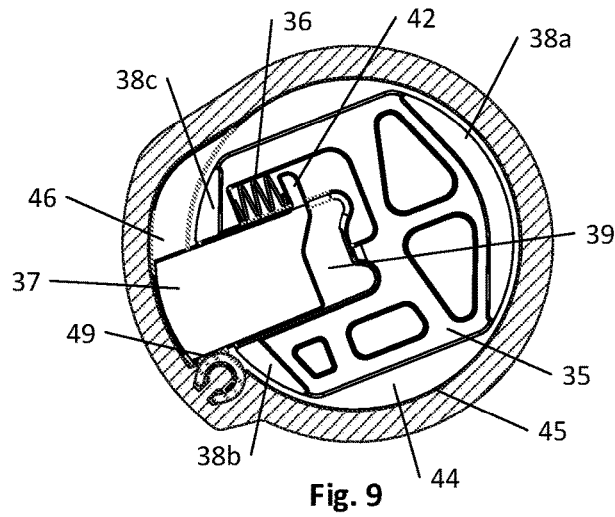

A linear actuator according to the invention will be described more fully below under reference to the accompanying drawing. The drawing shows:

FIG. 1, an outline of a hospital or care bed,

FIG. 2, a perspective view of a linear actuator with quick release, brake means and a coupling for activating the brake means, FIG. 3, a longitudinal cross section of the linear actuator in FIG. 2, FIG. 4, an exploded perspective of a rear mounting, centrifugal coupling, and brake means, FIG. 5a-d, different views of a damper holder of the centrifugal coupling, FIG. 6a-b, two perspectives of a sliding element of the centrifugal coupling, FIG. 7a-b, a top view and a perspective of the rear mounting, FIG. 8, a cross section of the linear actuator through the rear mounting, where the centrifugal coupling is in a slipping or disengaged state, FIG. 9, a cross section of the linear actuator through the rear mounting, where the centrifugal coupling is in an engaged state, FIG. 10a-b, a side view and perspective of the centrifugal coupling and rotary damper, where the centrifugal coupling is in a slipping or disengaged state, FIG. 11a-b, a side view and perspective of the centrifugal coupling and rotary damper, where the centrifugal coupling is in an engaged state, and FIG. 12a-b, a schematic cross section of second embodiment of the coupling.

The hospital or care bed 1 shown in FIG. 1 of the drawing comprises a lower frame 2 equipped with drive wheels 3 and an upper frame 4. An adjustable carrying surface for the mattress is mounted to the upper frame 4. The carrying surface comprises a back-rest section 5, an articulated leg-rest section 6 and a fixed middle section 7 between these two sections 5,6. The back-rest and leg-rest sections 5,6 can be adjusted with a linear actuator 8,9 each, such that the carrying surface can assume various contours, indicated by the arrow 10. The upper frame 4 is connected to the lower frame 2 with a lever mechanism 11,12 at each end. The upper frame 4 can be raised and lowered by means of a pair of actuators 13,14 connected to the lever mechanism 11,12. The actuators 8,9;13,14 are connected to a control box 15 containing a power supply for connection to mains, optionally a rechargeable battery pack as well as a controller. Operating units such as hand controls 16 and fixed control panels in guard rails 17 are connected to the control box 15.

FIG. 2 shows a linear actuator 8 which is arranged to move the back-rest section 5 of the hospital or care bed 1. The linear actuator comprises a housing 18 with a reversible electric motor 19, which through a worm gear 20 drives a spindle 21 with a spindle nut 22, to which a tubular adjustment element 23, also called an inner tube, surrounded by an outer tube 24, is secured. A front mounting 25 is located at the end of the tubular adjustment element 23, and a rear mounting 26 for mounting of the linear actuator 8 is located at the rear end of the linear actuator. The linear actuator 8 is equipped with a quick release unit 27 with a release mechanism.

Referring to FIGS. 3-11, the linear actuator 8 comprises a rotary damper 28 which is connected to the lower/rear end of the spindle 21, i.e. the end closest to the rear mounting 26. The rotary damper 28 comprises an inner body in the shape of a cylinder placed in a liquid-filled hollow in an outer body 29. The liquid used in the hollow of the rotary damper 28 is preferably a silicone oil. The inner body is through a shaft end 30 in driving connection with the shaft end of the spindle 21.

The rotary damper 28 can be connected directly to the spindle 21 or via one or more parts depending on the specific construction of a linear actuator. In the present embodiment (FIGS. 2-11), the shaft end 30 of the rotary damper 28 is connected to a gear wheel 31, which engages a position wheel 32. The rear end of the spindle 21 is connected to an end nut 33, which engages the position wheel 32.

The outer body 29 of the rotary damper 28 is fixed to a centrifugal coupling 34, which comprises a damper holder 35, a spring 36, and a sliding element 37. The damper holder 35 is a circular element with two circular segments cut off.

Collars 38a-c for rotationally fixing the rotary damper 28 to the damper holder 35 extends from an upper side thereof. The damper holder 35 has a cavity 39 with two openings

40,41. The opening 40 is open towards the upper end and the opening 41 is open to the side of the damper holder 35. The cavity 39 is adapted to receive the sliding element 37, which is shaped as an oblong rectangular block with a protrusion 42 at one end extending to the side of the sliding element 37. The end of the sliding element 37 placed at the opening 41 is curved such that it levels with the circular outer surface of the damper holder 35. A small part of the cavity 39 is adapted to receive a spring 36, here a compression coil spring. One end of the spring 36 engages a wall piece 43 of the cavity 39. The other end of the spring 36 engages the protrusion 42 of the sliding element 37. To fit in the space between the wall piece 43 and the protrusion 42, the spring 36 is compressed and therefore in a pre-stressed state. Hence, the sliding element 37 is spring-loaded.

The rear mounting 26 comprises a cavity 44 having a wall 45 with an approximately circular cross section. The cavity 44 is adapted to receive at least a part of the coupling 34 with a small distance of play between the coupling 34 and the wall 45. A circular arc of the circumference of the wall 45 is displaced radially outwards, creating a small arc shaped track 46 relative to the circular cross section of the cavity 44. The cavity 44 has a small hole 47 at its bottom adapted to receive a pin 48 extending from the underside of the damper holder 35 with a small distance or play between the two. In this embodiment, the underside of the damper holder 35 engages a part of the bottom of the cavity 44. This serves among other things to keep the rotary damper 28 in place along the longitudinal axis of the spindle 21.

Since the damper 28 and the coupling 34 (35,36,37) are directly and/or indirectly connected to the spindle 21, both will rotate together with the spindle 21. If the rotational speed of the spindle 21 passes a certain threshold, the centrifugal force exerted on the sliding element 37 will cause it to be displaced out of the opening 41 of the cavity 39. This threshold can only be reached if the quick release unit 27 is activated. Hence, during normal operation, the linear actuator 8 will not reach such a high rotational speed.

Passing the threshold will cause the curved end of the sliding element 37 to engage the wall 45 of the cavity 44 of the rear mounting 26. When the sliding element 37 reaches the circular arc of the circumference of the wall 45, it will displace into the arc shaped track 46. Once here, a side of the sliding element 37 will engage the end 49 of the track 46, which functions as a stop. In this embodiment, the track end 49 is constituted by a hollow cylindric tube 50 with a longitudinal slit, in which a protrusion of the wall 45 is received.

The relation between the size of the centrifugal force and the impact of the engagement between the sliding element 37 and the track end 49, determines whether the sliding element 37 remains in engagement with the track end 49 or is forced back into the cavity 39. The latter constitutes a slipping state of the coupling 34, which will cause the spindle 21, the damper 28 and the coupling 34 to continue its rotation. The former constitutes an engaged state of the coupling 34, which causes an activation of the rotary damper 28. More precisely, the damper holder 35 and thereby the outer body 29 of the rotary damper 28 will be kept in a fixed non-rotating position. Only the shaft end 30 of the inner body of the rotary damper 28 will continue to rotate with the spindle 21. Consequently, the rotary damper 28 will dampen the rotational speed of spindle 21. Upon reduction of the rotational speed of the spindle 21, the centrifugal force exerted on the sliding element 37 reduces, causing it to retract into the cavity 39. This again will cause the complete rotary damper 35, the coupling 34, and the spindle 21 to rotate together.

The coupling 34 will normally be in a slipping state a number of times, before the rotational speed reaches the threshold causing the coupling 34 to be in an engaged state. For the sake of clarity, a disengaged and slipping state of the coupling will be regarded as one single state. The threshold can be set to a determined level depending on the bed or other construction in which the linear actuator is used. A range number of parameters can be used to reach the threshold. These could be, but are not limited to, the following, namely the thread pitch of the spindle 21, geometry and material of the damper holder 35 and sliding element 37, and the spring force of the spring 36. The coupling 34 could also be embodied such that the spring 36 could be an extension spring rather than a compression spring.

In the present embodiment, the rotary damper 28 is rotationally fixed by the collars 38a-c and fixed along the longitudinal axis of the spindle by the engagement between the underside of the damper holder 35 and a part of the bottom of the cavity 44 of the rear mounting 26. In an alternative embodiment, the collars 38a-c could be embodied as snap locks and thus extend along the full height of the outer body 29 and engage the top surface thereof. This would fix the rotary damper 28 both rotationally and in the longitudinal direction. Engagement between the underside of the damper holder 35 and the bottom of the cavity 44 would therefore not be needed.

Instead of a rotary damper, other types of brake means or dampers could be used, e.g. a wrap spring brake.

FIG. 12a-b shows schematic cross sections of a second embodiment of the invention, where the coupling is a manual coupling. In FIGS. 12a-b, the rear mounting 50 of the linear actuator has a circular side wall forming a cavity 51 adapted for receiving at least a part of the manual coupling. The damper holder 52 comprises a protrusion 53 extending out from the side of damper holder 52. The rear mounting 50 comprises a stop element 54, which can be moved in and out of the cavity 51. Collars 55a-c for rotationally fixing a brake means to the damper holder 52 extends from an upper side thereof. The brake means is connected to the spindle of the linear actuator in the same way as described in the first embodiment. At least the damper holder 52 and the stop element 54 constitutes the manual coupling of this embodiment. The manual coupling can be in either of two states as the centrifugal coupling 34 of the first embodiment. A slipping or disengaged state where the stop element 54 is fully or almost fully retracted from the cavity 51, such that the damper holder 52 can rotate freely, or an engaged state where the stop element 54 is extended into the cavity 51, such that the protrusion 53 engages the stop element 54, whereby the damper holder 52 cannot rotate. In the latter situation, the brake means will be in an active state and thus dampen the rotational speed of the spindle. In the former situation, slipping or disengaged state, the brake means will be in an inactive state and thus not dampen the rotational speed of the spindle.

The invention claimed is:

1. A linear actuator comprising:
   a reversible electric motor (19),
   a transmission (20), and
   a non-self-locking spindle (21),
   wherein the electric motor (19), through the transmission (20), drives the non-self-locking spindle (21), and wherein the linear actuator comprises a spindle nut (22) on the spindle (21) and an adjustment element (23) secured against rotation, and wherein the adjustment element (23) can be moved axially, in that the adjustment element (23) is connected to or integral with the spindle nut (22) on the spindle (21), and wherein the linear actuator further comprises a quick release (27) for disengagement of the adjustment element (23) from the reversible electric motor (19) and the part of the transmission (20) extending from the reversible electric motor (19) to the quick release (27), such that the spindle (21) is rotated under the load on the adjustment element (23), and wherein the linear actuator comprises brake means (28) connected to the spindle for controlling the speed of the adjustment element (23) under the external load when the quick release is activated, characterized in that the linear actuator comprises a coupling (34; 52,53,54) connected to the brake means (28), wherein the brake means (28) is configured to be in either
1) an active state, wherein the rotation of the spindle (21) is braked, or
2) An inactive state, wherein the rotation of the spindle (21) is not braked, and wherein the coupling is (34; 52,53,54) configured to be in a state of either
3) engaged, or
4) slipping or disengaged, and wherein the coupling (34; 52,53,54) is configured to set the brake means (28) in
1) the active state, when the coupling (34; 52,53,54) is 3) engaged, or
2) the inactive state, when the coupling (34; 52,53,54) is 4) slipping or disengaged.

2. The linear actuator according to claim 1, further comprising:
a rear mounting (26) for mounting of the linear actuator, characterized in that the rear mounting (26) comprises a cavity (44) adapted to receive at least a part of the coupling,
wherein a side wall (45) of the cavity has an approximately circular cross section, and wherein a circular arc of the side wall (45) is displaced radially outwards, and wherein the circular arc comprises a stop (49).

3. The linear actuator according to claim 1, characterized in that the brake means is a rotary damper (28).

4. The linear actuator according to claim 1, characterized in that the brake means is a wrap spring.

5. The linear actuator according to claim 1, characterized in that the coupling is a manual coupling (52,53,54).

6. The linear actuator according to claim 5, further comprising a rear mounting (26) for mounting of the linear actuator, characterized in that the manual coupling (52,53,54) comprises a damper holder (52) with a protrusion (53) extending out from a side of the damper holder (52), and wherein the rear mounting (26) comprises a cavity (51) for receiving at least a part of the manual coupling, and further comprises a stop element (54), which can be moved in and out of the cavity (51) by a manual operation,
wherein the manual coupling (52,53,54) is in the engaged state when the stop element (54) extends into the cavity (51), such that the protrusion (53) engages the stop element (54), whereby the damper holder (52) cannot rotate, and wherein the manual coupling (52,53,54) is in the slipping or disengaged state when the stop element (54) is fully or almost fully retracted from the cavity (51), such that the damper holder (52) can rotate.

7. A bed comprising an adjustable carrying surface for a mattress, wherein the carrying surface comprises an adjustable section (5, 6),
characterized in that the
bed comprises at least one linear actuator according to claim 1, wherein the linear actuator is configured to adjust the adjustable section of the bed.

8. The bed according to claim 7,
characterized in that the adjustable section is a back-rest section (5).

9. The bed according to claim 7,
characterized in that the bed is a hospital or care bed (1).

10. The linear actuator according to claim 1, characterized in that the coupling is a centrifugal coupling (34).

11. The linear actuator according to claim 10, characterized in that the centrifugal coupling (34) comprises a damper holder (35), a spring (36), and a sliding element (37),
wherein the damper holder (35) comprises a cavity (39) for receiving the sliding element (37),
and wherein the cavity (39) comprises an opening (41) through which at least a part of the sliding element (37) can be displaced,
wherein the spring (36) is arranged between the sliding element (37) and the damper holder (35) such that the sliding element (37) is spring-loaded relative to the damper holder (35),
wherein the linear actuator comprises a stop (49) prepared for engagement with the part of the spring-loaded sliding element (37) extending out of the opening of the damper holder (35),
wherein the coupling is in
3) the engaged state, when the part of the spring-loaded sliding element (37) extending out of the opening (41) of the damper holder (35) fully engages the stop (49), and
4) the slipping or disengaged state, when the part of the spring-loaded sliding element (37) extending out of the opening of the damper holder (35) is slipping or disengaged from the stop (49).

12. The linear actuator according to claim 11, characterized in that the spring is a compression spring (36).

13. The linear actuator according to claim 11, characterized in that the spring is an extension spring.

* * * * *